US010970386B2

(12) United States Patent
Cho et al.

(10) Patent No.: US 10,970,386 B2
(45) Date of Patent: **\*Apr. 6, 2021**

(54) SCALABLE COMPUTING ENVIRONMENT GENERATION AND COMPUTE RESOURCE ASSIGNMENT

(71) Applicant: Microsoft Technology Licensing, LLC, Redmond, WA (US)

(72) Inventors: Joey Beum Cho, Issaquah, WA (US); Avinash Tiruchanapalli Suresh, Redmond, WA (US); Jonathan Acone, Redmond, WA (US); Vivek Bapuji Dalvi, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 316 days.

This patent is subject to a terminal disclaimer.

(21) Appl. No.: 15/995,117

(22) Filed: May 31, 2018

(65) Prior Publication Data

US 2019/0370458 A1   Dec. 5, 2019

(51) Int. Cl.
*G06F 9/455* (2018.01)
*G06F 21/53* (2013.01)
(Continued)

(52) U.S. Cl.
CPC .......... *G06F 21/53* (2013.01); *G06F 9/45558* (2013.01); *G06F 9/5077* (2013.01);
(Continued)

(58) Field of Classification Search
CPC .... G06F 21/53; G06F 9/45558; G06F 9/5077; G06F 2009/4557; G06F 2009/45587;
(Continued)

(56) References Cited

U.S. PATENT DOCUMENTS

| 8,756,598 B1\* | 6/2014 | Costea | G06F 9/45558 |
| | | | 717/174 |
| 10,356,087 B1\* | 7/2019 | Vetter | H04L 9/0863 |

(Continued)

FOREIGN PATENT DOCUMENTS

WO    2011025670 A1    3/2011

OTHER PUBLICATIONS

"International Search Report and Written Opinion Issued in PCT Application No. PCT/US19/032544", dated Aug. 22, 2019, 18 Pages.

*Primary Examiner* — Bradley A Teets
(74) *Attorney, Agent, or Firm* — Watson Patents, PLC; Vladan M. Vasiljevic

(57) ABSTRACT

Computing environments can be scalably generated and provisioned based on one or more team definitions and definitions of one or more projects assigned to a particular team. Digital constructs can be generated to represent the teams and the projects assigned to such teams, and such digital constructs can comprise metadata identifying sandboxes to generate and, within those sandboxes, computing environments to generate and how such computing environments are to be provisioned. The sandboxes can be generated in parallel and the computing environments can be provisioned in parallel, or staggered based on individual user access. Assignment of consumption limitations can be individually adjusted from default values, and monitoring of such consumption limitations can be performed on an aggregated basis.

20 Claims, 4 Drawing Sheets

(51) Int. Cl.
*H04L 29/06* (2006.01)
*G06F 9/50* (2006.01)
(52) U.S. Cl.
CPC ...... *H04L 63/10* (2013.01); *G06F 2009/4557* (2013.01); *G06F 2009/45587* (2013.01); *G06F 2009/45591* (2013.01); *G06F 2009/45595* (2013.01)
(58) Field of Classification Search
CPC . G06F 2009/45591; G06F 2009/45595; H04L 63/10
USPC .......................................................... 718/1
See application file for complete search history.

(56) References Cited

U.S. PATENT DOCUMENTS

| | | | |
|---|---|---|---|
| 2012/0226796 A1* | 9/2012 | Morgan | H04L 67/10 709/224 |
| 2013/0074064 A1 | 3/2013 | Das et al. | |
| 2013/0290954 A1 | 10/2013 | Dorland et al. | |
| 2014/0380312 A1* | 12/2014 | Ansel | G06F 21/53 718/1 |
| 2015/0235045 A1* | 8/2015 | Schmitt | G06F 16/21 707/784 |
| 2015/0365351 A1* | 12/2015 | Suit | G06F 8/60 709/226 |
| 2018/0011871 A1* | 1/2018 | Kroll | G06F 8/65 |
| 2019/0370081 A1* | 12/2019 | Suresh | G06F 9/45558 |

\* cited by examiner

SCALABLE COMPUTING ENVIRONMENT GENERATION AND COMPUTE RESOURCE ASSIGNMENT

BACKGROUND

Increasingly, a computing environment need not be supported by hardware that is physically co-located with a user utilizing such a computing environment, but rather can be supported by networked computing hardware aggregated into large data centers that are physically remote from the user. Often such computing environments are referred to as "cloud computing environments" and can provide users with different computing environments that are typically supported by virtual machines posted by large collections of computing hardware providing stability, redundancy, and high availability. Typically, the provisioning of computing environments, such as virtual machines, can be performed once, such as by an administrator, and the resulting provisioned computing environments can then be provided to users to utilize, with such utilization of compute resources being invoiced in an ongoing manner. Often, the generation and provisioning of computing environments can be tedious and time-consuming, even for skilled administrators, especially if the quantity of such computing environments to be generated is high.

In variable team settings, there can be a need for the generation of, and provisioning of, multiple computing environments on a repeated basis. For example, a team comprised of multiple different individuals can need to have multiple computing environments provision for each such individual in accordance with multiple different tasks, or projects, that the individual members of such a team are to perform. Often, such situations arise in educational contexts. For example, a computer science professor can seek to educate one of his classes in implementing functionality with a database application, while another of his classes can be educated in programming with a specific set of application development tools. In such an example, the professor would be required to establish one set of computing environments for each individual in the class directed to implementing functionality with a database application, and would then be further required to establish another set of computing environments for each individual in the class directed to programming with the specific set of application development tools. Should the first class then subsequently be assigned a project directed to an image editing application, the professor could again be required to establish an entirely different set of computing environments for each individual in that class. If such classes comprise tens or hundreds of students, the quantity of computing environments to be established can quickly become untenable.

Moreover, resource consumption limits can further complicate the professor's difficulties, since, often, such professors may not be able to obtain additional resource consumption credits. In particular, while resource consumption limitations can be established through a single administrator, such as the professor in the above example, typical cloud computing environments are invoiced separately, thereby requiring the professor to divide up any resource consumption limitations among the multiple different computing environments that were provisioned. The distribution of such resource consumption limitations can further exacerbate the impossibility of manually establishing computing environments in such team settings.

SUMMARY

Computing environments can be scalably generated and provisioned based on one or more team definitions and definitions of one or more projects assigned to a particular team. Digital constructs can be generated to represent the teams and the projects assigned to such teams, and such digital constructs can comprise metadata identifying sandboxes to generate and, within those sandboxes, computing environments to generate and how such computing environments are to be provisioned. The sandboxes can be generated in parallel and the computing environments can be provisioned in parallel, or staggered based on individual user access. Assignment of consumption limitations can be individually adjusted from default values, and monitoring of such consumption limitations can be performed on an aggregated basis.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

The following description relates to the scalable generation and provisioning of sandboxes for individual users and computing environments usable by such users within those sandboxes. Such sandboxes and computing environments can be generated and provisioned based on one or more team definitions and definitions of one or more projects assigned to a particular team. Digital constructs can be generated to represent the teams and the projects assigned to such teams, and such digital constructs can comprise metadata identifying sandboxes to generate and, within those sandboxes, computing environments to generate and how such computing environments are to be provisioned. The sandboxes can be generated in parallel and the computing environments can be provisioned in parallel, or staggered based on individual user access. Assignment of consumption limitations can be individually adjusted from default values, and monitoring of such consumption limitations can be performed on an aggregated basis.

Although not required, the description below will be in the general context of computer-executable instructions, such as program modules, being executed by a computing device. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including servers, hand-held devices, multi-processor systems, microprocessor based or programmable consumer electronics, network PCs, minicomputers, mainframe computers, and the like. Similarly, the computing devices need not be limited to stand-alone computing devices, as the mechanisms may also be practiced in distributed computing environments where tasks are performed by remote processing devices that are linked through a communications network. In a distributed computing environment, program modules may be located in both local and remote memory storage devices.

Figure 1:
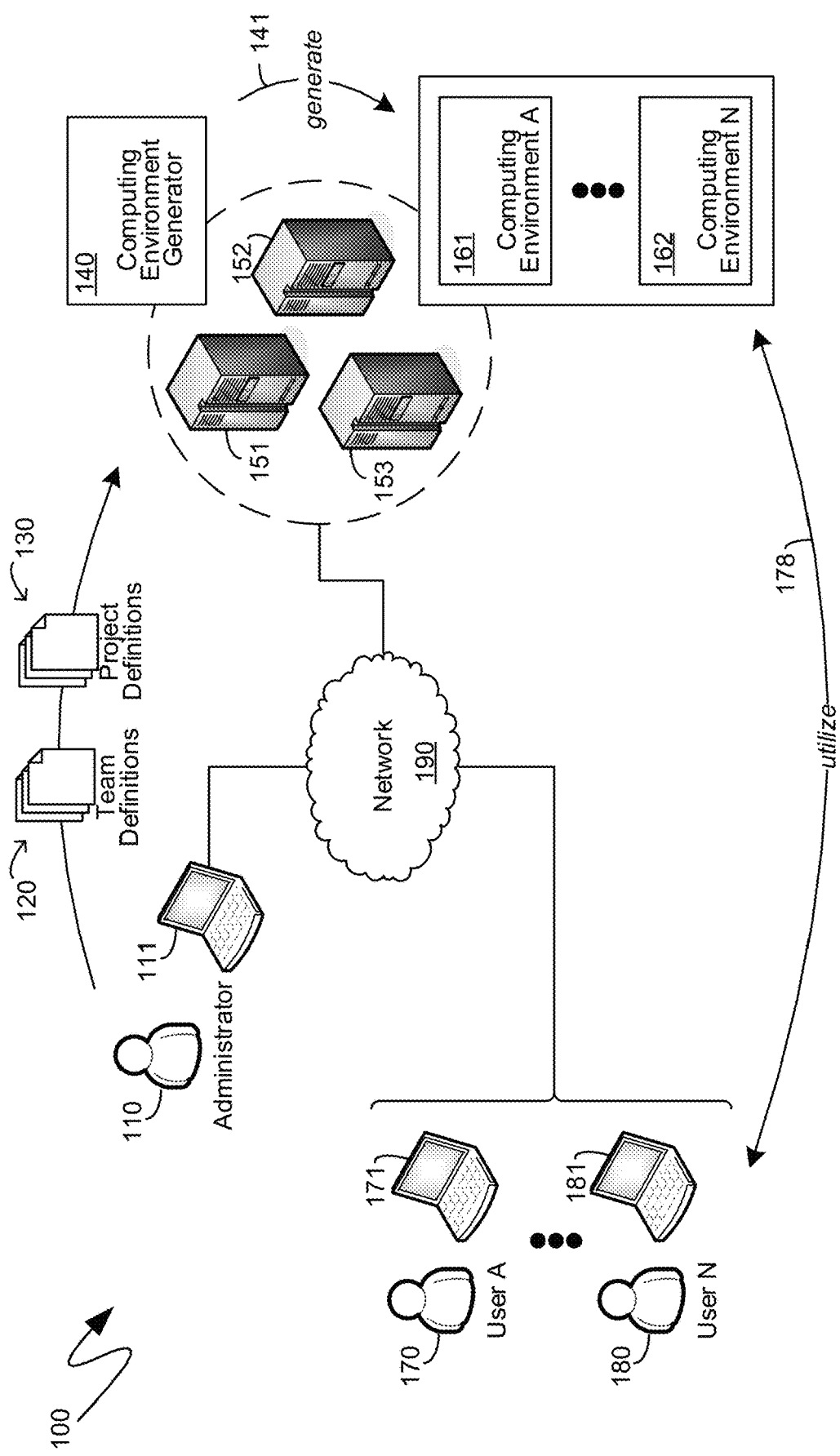
FIG. 1 is a system diagram of an exemplary system providing for computing environment generation.

With reference to FIG. 1, an exemplary system 100 is illustrated, providing context for the descriptions below. An administrator, such as the exemplary administrator 110, can provide one or more team definitions, such as the exemplary team definitions 120, and one or more project definitions, such as the exemplary project definitions 130 to a computing environment generator, such as the exemplary computing environment generator 140. For purposes of illustrating the underlying computing hardware context, the administrator 110 can utilize a computing device, such as the exemplary personal computing device 111, which can be communicationally coupled to one or more server computing devices, such as the exemplary server computing devices 151, 152 and 153, via a computer communication network, such as the exemplary network 190.

According to one aspect, a team definition, such as one of the team definitions 120, can comprise a roster, or other like listing of individual users, or entities that comprise a particular team. A team definition can further comprise information such as identifying information, such as a name, as well as information relevant to establishing compute resource projects and limitations. For example, a team definition can comprise a listing of students in a class, as well as an indication of a quantity of compute resources, expressed in any appropriate compute resource metric. For example, a team definition can comprise an enumeration of compute resources in terms of a quantity of processor hours, dollars, memory consumption, or other like quantification of compute resources. Compute resources, therefore, are consumed, or accounted for, as a computing environment performs computations or other like computer processing. Such compute resources can have been assigned to the administrator 110, who can be a professor of such a class, through a grant or other like resource assignment mechanism. Consequently, according to one aspect, compute resources can be enumerated in terms of a limit, such as a grant limit, that is not to be exceeded, or which can be exhausted once all such compute resources are used up, or otherwise consumed by the execution of computations on the computing environments.

Additionally, according to one aspect, a project definition can comprise information indicative of the computing environment that is to be generated, as well as identifying information, such as a name of the project, and also instructions or other foundational materials relevant to the initiation, performance or completion of the project. For example, a project directed to database operations can have a project definition associated with it that identifies the computing environment that is to be generated for such a project as comprising a processor of a given type, speed, or other like processor-indicative attributes, a quantity of memory, a quantity of storage capacity, and relevant application programs, such as the database application. Each individual performing such a project can, thereby, be provided with a computing environment that is tailored to such a project, such as would have been designed by a professor teaching a class. Additionally, a project directed to database operations can include a manual, syllabus, instructions, or other like information that can be provided, such as by the professor teaching the class on database operations.

Upon receipt of team and project definitions, such as the exemplary team definitions 120 and project definitions 130, a computing environment generator, such as the exemplary computing environment generator 140, can generate multiple computing environments, such as the exemplary computing environments 161 and 162, as illustrated by the generate action 141. More specifically, the computing environment generator can generate a computing environment for each project for each team member. Thus, for example, if one of the team definitions 120 enumerated ten entities as being part of a given team, and two of the project definitions 130 indicated that they were assigned to that team, then the computing environment generator 140 can generate twenty computing environments, one for each member of the ten-member team that corresponds to the first project, and another for each member of that same ten-member team that corresponds to the second project. The computing environment generator can additionally assign limitations, or other like controls directed to compute resource consumption by such computing environments. To provide security and control over such computing environments, the computing environment generator, such as the exemplary computing environment generator 140, can establish administrative and security policies, such as identifying individual users to whom user access to such computing environments will be granted, while also identifying an administrator, such as the exemplary ministry 110, as having administrative privileges to such environments including, for example, the ability to modify the parameters or resources of such environments, as well as other administrative controls.

According to one aspect, the generated computing environments, such as the exemplary computing environments 161 and 162, can be virtual machines hosted by one or more of the computing devices 151, 152 and 153. Such virtual machines can present a virtualized computing environment that, through hypervisors and other like mechanisms, is, ultimately, supported by the hardware and software of the host computing devices, such as the exemplary computing devices 151, 152 and 153. According to one aspect, the computing devices 151, 152 and 153 can be datacenter-based server computing devices that can provide redundant and parallelized hardware and software for the hosting of remotely-accessible computing services, such as cloud computing services. Such services can include the hosting of virtual machines or other like computing environments. Users of such a hosting service, such as the exemplary users 170 and 180, can have an account, or other like construct, through which their ability to access the hosting service, and utilize its hardware and software capabilities is controlled. Typically, such accounts are in the form of subscriptions that enumerate the temporal, computational and other like limitations of a user's access to the hardware and software of the hosting service. As utilized herein, the term "sandbox" means a subscription or other like enumeration of temporal, computational or other like abilities provided for, or limitations expressed on, a user's utilization of a computationally-based hosting service. While the precise hierarchy of sandboxes and the computing environments, hosted by a hosting service, accessible thereby, can be orthogonal to the descriptions herein, as will be detailed below, reference to the generation of computing environment, such as the generation of the exemplary computing environments 161 and 162 by the exemplary computing environment generator 140 can include the generation of one or more sandboxes through which such computing environments can be accessed and utilized as hosted by, and executed on, the hardware and software of a hosting service, such as the hardware graphically represented by the computing devices 151, 152 and 153 illustrated in FIG. 1.

In addition to generating computing environments, the exemplary computing environment generator 140 can further generate digital constructs that can be linked to the computing environments, thereby facilitating the management thereof. For example, for each of the team definitions 120, a team can be created by the computing environment generator 140, where the term "team" as utilized herein, means a digital construct that is a collection of user identities and with which metadata can be associated to link additional information thereto. For example, team metadata can comprise an identifier for the team, such as a team name, and compute resource limitations or availabilities that are applicable to the team.

In a like manner, the computing environment generator 140 can generate, for each of the project definitions 130, projects, where the term "project" as utilized herein means a digital construct that serves to record metadata, such as identifying information, instructional materials, templates defining attributes of the computing environments, compute resource limitations, and other like metadata. Once the computing environment generator 140 generates one or more teams and one or more projects, the computing environment generator 140 can link specific projects to specific teams. Additionally, the computing environment generator 140 can link the generated computing environments, such as the exemplary computing environments 161 and 162, to the project for which such computing environments were generated. Individual users, such as the exemplary individual users 170 and 180 can utilize computing devices, such as the exemplary computing devices 171 and 181, to access the computing environments that were generated by the computing environment generator 140, such as the exemplary computing environments 161 and 162. More specifically, the exemplary computing devices 171 and 181 can be communicationally coupled to one or more server computing devices, such as the exemplary server computing devices 151, 152 and 153, through a computer communication network, such as the exemplary network 190. As illustrated by the utilize action 178 in FIG. 1, the users, such as the exemplary users 170 and 180, can utilize computing environments generated by the computing environment generator 140, such as the exemplary computing environments 161 and 162, to perform the projects and consume compute resources in the process.

Figure 2:
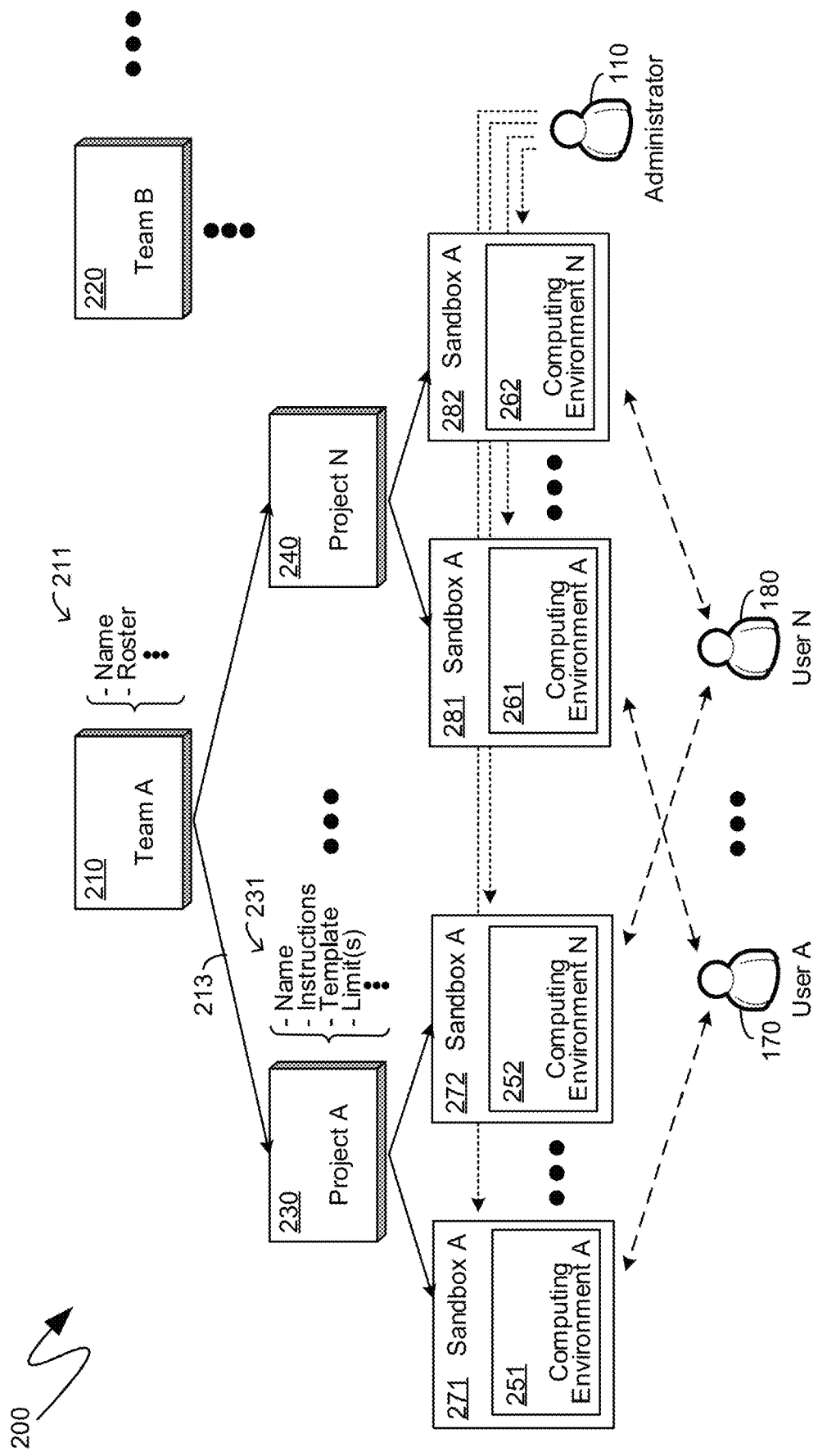
FIG. 2 is a system diagram of an exemplary system providing scalable computing environment generation.

Turning to FIG. 2, the exemplary system 200 shown therein illustrates an exemplary linkage between computing environments, sandboxes, projects and teams. Teams, such as the exemplary teams 210 and 220, and projects, such as the exemplary projects 230 and 240, can be generated based on information received from team and project definitions. For example, the exemplary team 210 can comprise a wrapper that can include metadata indicative of the name of the team, a roster of individuals, in the form of user identities, that comprise the team 210, and other like information. Similarly, the exemplary project 230 can comprise a wrapper that can include metadata indicative of the name of a project, instructions or other like resources applicable to initiating, performing or completing the project, compute resource limitations associated with the project, a computing environment template defining a computing environment on which the project is to be performed, and other like metadata. Additionally, the project 230 can be assigned to the team 210. Accordingly, a linkage can be made, as illustrated by the arrow 213, between the project 230 and the team 210.

The exemplary system 200, shown in FIG. 2, illustrates multiple projects being assigned to the team 210, including, for example, the project 230 and the project 240. According to one example, such projects can be representative of homework projects, or school work projects, assigned to the students of the class, where the team 210 represents that class.

Additional linkages can be formed between individual computing environments and the project to which they correspond. For example, the project 230 can have specified, and can have included as part of the metadata 231, a computing environment definition template. As indicated previously, such a template can comprise an identification of a quantity, type, speed, and other like defining attributes of processors that are to be emulated or represented within such a computing environment. As also indicated previously, such a template can comprise an identification of a quantity of memory, storage capacity, and other like computing environment attributes. Additionally, such a template can comprise an identification of the types of computer software, such as operating systems and application programs that are to be installed on the computing environment. Multiple computing environments, such as the exemplary computing environments 251 and 252, can be created based upon a computing environment definition template, which can be one of the templates enumerated in the metadata 231. According to one aspect, one computing environment can be generated for each individual enumerated in the roster of the team 210 to which the project 230, for which such computing environments are being generated, is linked. In a like manner, computing environments 261 and 262 can be generated.

The generated computing environments, such as the exemplary computing environments 251, 252, 261 and 262, can be in the form of virtual machines hosted by a service that provides the hardware and software to support the hosting of such virtual machines. In such an instance, the generation of an individual computing environment, such as the generation of an individual virtual machine image and the subsequent loading of such a virtual machine image with virtualization software, including a hypervisor or other like virtualization software, can be one part of the afore-described generation of a computing environment. Another part can be the generation of a sandbox, such as a subscription, account, or other like construct, within the context of the hosting service itself that can provide a mechanism through which the user can access and utilize the computing environments. For example, such a sandbox can provide a mechanism by which access to the service is limited or tracked. Thus, the generation of a computing environment can entail the generation of a sandbox within which that computing environment will be accessed.

A sandbox, such as the exemplary sandbox 271, can also be generated based on a template, such as a sandbox template, that can be one of the templates of the metadata 231 associated with the project 230. A sandbox template can specify aspects of a sandbox, such as type of account or subscription, pre-established limitations placed upon, or abilities granted to, such an account or subscription, and other like definitional or attributional aspects.

Once generated, security and administrative boundaries can be established for the computing environments and the sandboxes containing such computing environments. For example, the computing environment 251 can be accessed by a user, such as the exemplary user 170, through a sandbox, such as the exemplary sandbox 271, which can represent a security and administrative boundary that enables the computing environment 251 to be accessed by the user 170 but not, for example, by the user 180. In other words, the computing environment 251, and the sandbox 271, can be associated with a specific user, such as the exemplary user 170, such that the user 170 can access the sandbox 271 and utilize the computing environment 251, to the exclusion of other users, such as the exemplary user 180. In a similar manner, the computing environment 261, corresponding to a different project, can also be accessed by the user 170 but not, for example, by the user 180. Conversely, computing environments 252 and 262 can be accessed by the user 180, to the exclusion of the user 170. According to one aspect, such multiple computing environments can be presented to users through an appropriate graphical user interface, such as an account or subscription graphical user interface that can graphically represent, to a given user, all of the computing environments available to such a user. Such a graphical user interface can additionally present information from the team or project to which a user's sandbox is linked. For example, the user 170, upon accessing the sandbox 271, can be provided with a graphical user interface that displays, not only a mechanism by which the user 170 can access the computing environment 251, but also information about the project 230, such as, for example, the project name, project instructions, manuals, notes and other like informational material, and other aspects that can be part of the metadata 231 of the project 230. Additionally, the user 170 can, analogously, be provided with information obtained from the metadata 211 associated with the team 210, such as, for example, the team name.

To facilitate management and administration of computing environments, each of the computing environments 251, 252, 261 and 262, and the sandboxes within the context of which such computing environments are accessed, such as the exemplary sandboxes 271, 272, 281 and 282, can also be associated with administrative privileges that can be granted to one or more users. In the specific example illustrated by the system 200 of FIG. 2, the administrator 110 is shown as having such had such administrative access granted to them. As indicated previously, the administrator 110 can be a professor of the class that is assigning the projects to the individual students of the class.

According to one aspect, the consumption of compute resources can be accounted for at the individual computing environment or sandbox level. Consequently, compute resources assigned on a team basis, or project basis, can be distributed among the various computing environments being created. For example, compute resource limitations or availability can be equally distributed among all of the computing environments to which such limitations or availability apply. For example, compute resource limitations enumerated in the metadata 231, and applicable to the project 230, can be replicated among the computing environments 251 and 252. According to one aspect, however, such a default project can be manually changed, such as by an administrator, such as the exemplary administrator 110, either at the time that the computing environments, such as the exemplary computing environments 251 and 252, are generated, or at a subsequent time. The allocation of compute resources, and the subsequent monitoring of the consumption or utilization thereof, can be performed in a hierarchical manner. Thus, for example, compute resources can be allocated to the team 210, and can be enumerated in the metadata 211 associated with the team 210. A portion of such compute resources can then be allocated to each of the project 230 and 240, as well as any other projects assigned to the team 210. Such a portion can be an equal portion, with, for example, each of the project 230 and 240 being assigned half of the compute resources assigned to the team 210. Alternatively, such a portion can be dissimilar. Additionally, some amount of compute resources can be retained, such as at the team level, for future projects, or for future allocation to existing projects, such as the exemplary projects 230 and 240. Continuing with the hierarchical example, the portion of compute resources assigned to each project, such as from the team level, can then be further distributed among the computing environments linked to such a project. Thus, the portion of the compute resources assigned to the project 230, from the team 210, can be further distributed among the computing environments 251 and 252, such as in the manner detailed above. Mechanisms for distributed compute resources among any hierarchical level can be equally applied to any other hierarchical level.

Compute resource limitations can also include enumeration of one or more allowed or constrained services. For example, the computing environments 251 and 252 can be constrained to prevent the execution of specific, enumerated software packages. Conversely, or in addition, the computing environments 251 and 252 can be constrained to only allow the execution of specific, enumerated services, or can be explicitly allowed to have access to specific services, irrespective of other limitations.

The monitoring of the consumption of such compute resources can then also be aggregated at the project and team levels, as appropriate. For example, the consumption of compute resources by the users 170 and 180, in utilizing the computing environments 251 and 252, respectively, can be aggregated and compared against compute resource limitations enumerated in the metadata 231 associated with the project 230. In a similar manner, if compute resource limitations or available quantity was enumerated on a team-wide basis, then the compute resource consumption of the individual computing environments can be aggregated at the project level, and then such aggregation can be further aggregated at the team level.

Figure 3:
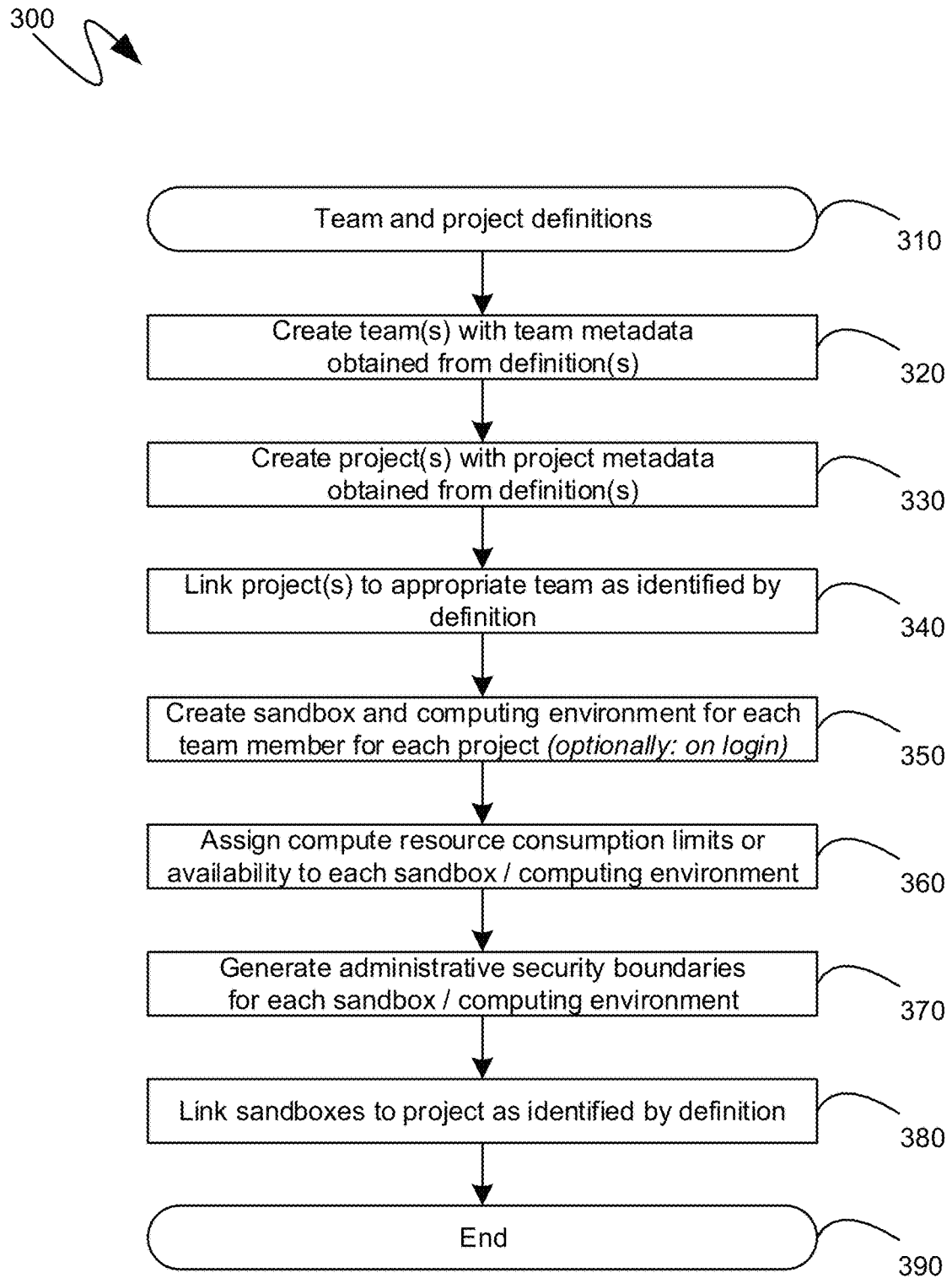
FIG. 3 is a flow diagram of an exemplary computing environment generation and provisioning mechanism.

Turning to FIG. 3, the flow diagram 300 shown therein illustrates an exemplary series of steps by which computing environments can be created at scale. Initially, at step 310, team and project definitions can be received. As indicated previously, such definitions can include team rosters, project computing resource templates, and other like information details above. Subsequently, at steps 320 and 330, teams and projects, from the definitions received at step 310, can be generated and metadata comprising information enumerated in such definitions can be wrapped around such teams and projects. At step 340 a linking between projects corresponding to teams to which such projects are assigned can be made.

At step 350, a computing environment can be generated for each team member, or entity, for each project, such as in the manner detailed above. More specifically, step 350 can comprise both the generation of sandboxes, as well as the creation of, computing environments that the user can access within the context of the sandbox. The creation of a virtual machine, for example, can be a time-consuming process, and, accordingly, aspects of step 350 can be performed in parallel, or in a staggered manner. As to the latter, according to one aspect, the creation of a virtual machine image can be triggered by a user attempting to log into their account, or otherwise access the sandbox associated with such a user. In such an instance, the user will be able to access the computing environment, within the context of the sandbox, once the on-demand creation of the computing environment completes.

Once the sandboxes and computing environments are created, such as at step 350, processing can proceed to step 360 and compute resource limitations or availability can be established for each individual sandbox and computing environment created at step 350. As indicated previously, step 360 can entail an initial distribution, such as an equal distribution across each computing environment associated with either a project, where such compute resource availability or limitation is defined at a project level, or each computing environment associated with a team, where such compute resource availability or limitation is defined at a team level. As part of step 360, however, such a default distribution can be modified, such as by an administrator, either in advance, in which case such modifications could be applied at step 360, or subsequently, in which case such modifications would not be part of the initial performance of the steps of the exemplary flow diagram 300 shown in FIG. 3.

Subsequently, at step 370, administrative and security boundaries can be generated for each sandbox and computing environment generated at step 350. Such boundaries can include defining individual users that will have user access to such computing environments, within the context of such sandboxes, and defining administrative access to such computing environments. As indicated previously, users having access to multiple computing environments can be presented with such multiple computing environments through an account graphical user interface or other like unified access mechanism. At step 380, a link can be created between the individual computing environments and the project sandbox corresponding to the project for which such computing environments were created. The relevant processing can then end at step 390.

Figure 4:
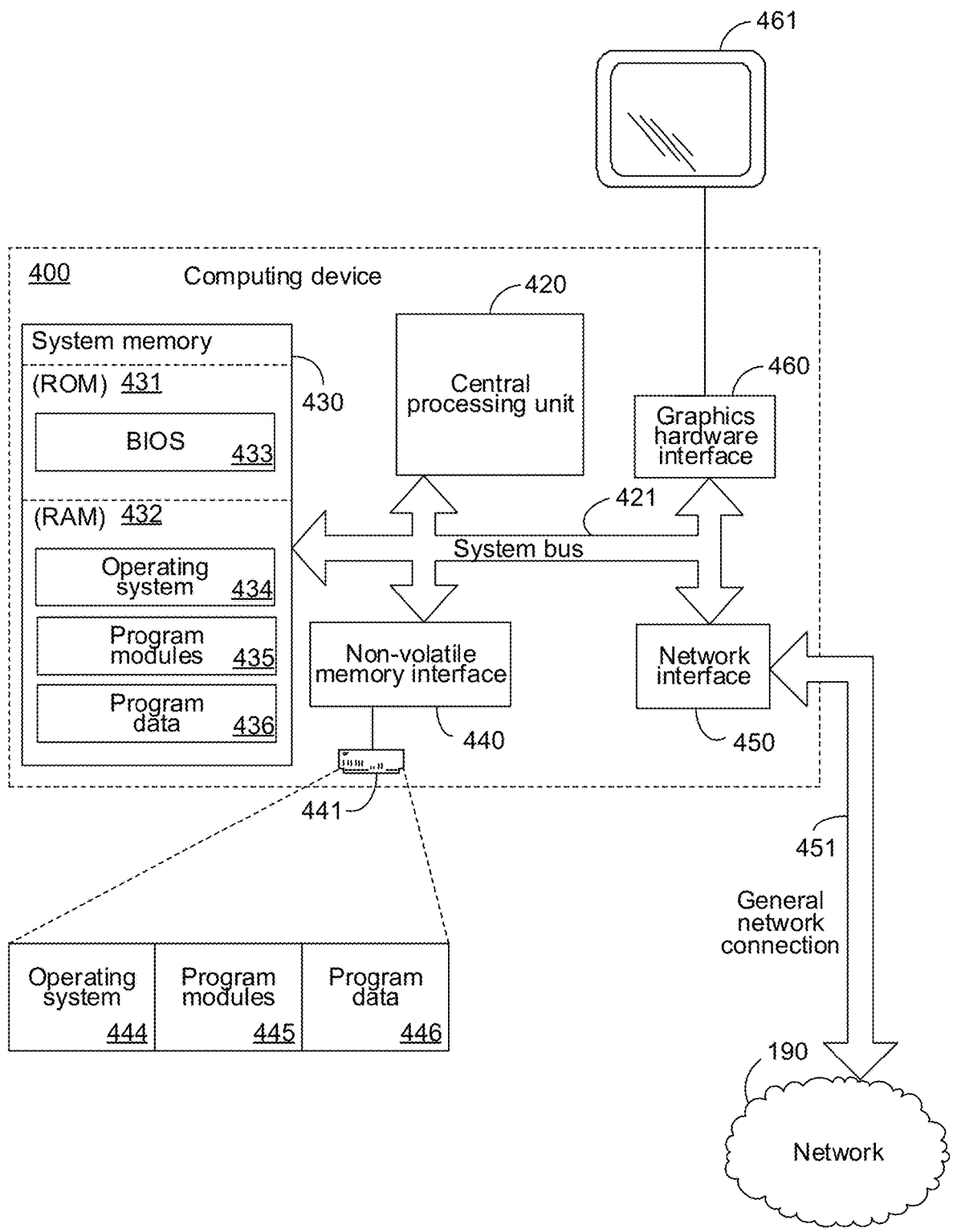
FIG. 4 is a block diagram of an exemplary computing device.

Turning to FIG. 4, an exemplary computing device 400 is illustrated which can perform some or all of the mechanisms and actions described above. The exemplary computing device 400 can include, but is not limited to, one or more central processing units (CPUs) 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. The computing device 400 can optionally include graphics hardware, including, but not limited to, a graphics hardware interface 460 and a display device 461, which can include display devices capable of receiving touch-based user input, such as a touch-sensitive, or multi-touch capable, display device. Depending on the specific physical implementation, one or more of the CPUs 420, the system memory 430 and other components of the computing device 400 can be physically co-located, such as on a single chip. In such a case, some or all of the system bus 421 can be nothing more than silicon pathways within a single chip structure and its illustration in FIG. 4 can be nothing more than notational convenience for the purpose of illustration.

The computing device 400 also typically includes computer readable media, which can include any available media that can be accessed by computing device 400 and includes both volatile and nonvolatile media and removable and non-removable media. By way of example, and not limitation, computer readable media may comprise computer storage media and communication media. Computer storage media includes media implemented in any method or technology for storage of content such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired content and which can be accessed by the computing device 400. Computer storage media, however, does not include communication media. Communication media typically embodies computer readable instructions, data structures, program modules or other data in a modulated data signal such as a carrier wave or other transport mechanism and includes any content delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer content between elements within computing device 400, such as during start-up, is typically stored in ROM 431. RAM 432 typically contains data and/or program modules that are immediately accessible to and/or presently being operated on by processing unit 420. By way of example, and not limitation, FIG. 4 illustrates operating system 434, other program modules 435, and program data 436.

The computing device 400 may also include other removable/non-removable, volatile/nonvolatile computer storage media. By way of example only, FIG. 4 illustrates a hard disk drive 441 that reads from or writes to non-removable, nonvolatile magnetic media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and other computer storage media as defined and delineated above. The hard disk drive 441 is typically connected to the system bus 421 through a non-volatile memory interface such as interface 440.

The drives and their associated computer storage media discussed above and illustrated in FIG. 4, provide storage of computer readable instructions, data structures, program modules and other data for the computing device 400. In FIG. 4, for example, hard disk drive 441 is illustrated as storing operating system 444, other program modules 445, and program data 446. Note that these components can either be the same as or different from operating system 434, other program modules 435 and program data 436. Operating system 444, other program modules 445 and program data 446 are given different numbers hereto illustrate that, at a minimum, they are different copies.

The computing device 400 may operate in a networked environment using logical connections to one or more remote computers. The computing device 400 is illustrated as being connected to the general network connection 451 (to the network 190) through a network interface or adapter 450, which is, in turn, connected to the system bus 421. In a networked environment, program modules depicted relative to the computing device 400, or portions or peripherals thereof, may be stored in the memory of one or more other computing devices that are communicatively coupled to the computing device 400 through the general network connection 461. It will be appreciated that the network connections shown are exemplary and other means of establishing a communications link between computing devices may be used.

Although described as a single physical device, the exemplary computing device 400 can be a virtual computing device, in which case the functionality of the above-described physical components, such as the CPU 420, the system memory 430, the network interface 440, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where the exemplary computing device 400 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. The term "computing device", therefore, as utilized herein, means either a physical computing device or a virtualized computing environment, including a virtual computing device, within which computer-executable instructions can be executed in a manner consistent with their execution by a physical computing device. Similarly, terms referring to physical components of the computing device, as utilized herein, mean either those physical components or virtualizations thereof performing the same or equivalent functions.

The descriptions above include, as a first example a method for generating a set of multiple virtual computing environments and allocating compute resources among the set of multiple virtual computing environments, the method comprising: generating a first set of multiple virtual computing environments, the first set of multiple virtual computing environments comprising a unique virtual computing environment for each member of a team that is enumerated by a team roster, wherein each virtual computing environment comprises emulation of computing hardware specified by a first template; providing, to each member of the team that is enumerated by the team roster, user access to the unique virtual computing environment of the first set of multiple virtual computing environments such that there is a one-to-one correspondence between virtual computing environments of the first set of multiple virtual computing environments and members of the team as enumerated by the team roster; providing administrator access to each virtual computing environment, of the first set of multiple virtual computing environments, to a first administrator linking each virtual computing environment, of the first set of multiple virtual computing environments, to a first project associated with a first project metadata that comprises the first template; linking the first project to a team associated with team metadata that comprises the team roster; allocating, to the team sandbox, compute resources available to the first administrator; allocating, to the first project sandbox, a portion of the compute resources available to the first administrator; and allocating, to each virtual computing environment, of the first set of multiple virtual computing environments, a first initial allocation of compute resources, the first initial allocation of compute resources being based on the portion of the compute resources allocated to the first project and on a quantity of virtual computing environments in the first set of virtual computing environments; wherein emulated computing, by a virtual computing environment, consumes compute resources allocated to the virtual computing environment.

A second example is the method of the first example, further comprising: generating a second set of multiple virtual computing environments, the second set of multiple virtual computing environments also comprising a unique virtual computing environment for each member of the team that is enumerated by the team roster, wherein each virtual computing environment comprises emulation of computing hardware specified by a second template; providing, to each member of the team that is enumerated by the team roster, user access to the unique virtual computing environment of the second set of multiple virtual computing environments such that there is a one-to-one correspondence between virtual computing environments of the second set of multiple virtual computing environments and members of the team as enumerated by the team roster; providing administrator access to each virtual computing environment, of the second set of multiple virtual computing environments, to the first administrator; linking each virtual computing environment, of the second set of multiple virtual computing environments, to a second project associated with a second project metadata that comprises the second template; linking the second project to the team sandbox; allocating, to the second project sandbox, another portion of the compute resources available to the first administrator; and allocating, to each virtual computing environment, of the second set of multiple virtual computing environments, a second initial allocation of compute resources, the second initial allocation of compute resources being based on the other portion of the compute resources allocated to the second project and on a quantity of virtual computing environments in the second set of virtual computing environments.

A third example is the method of the first example, further comprising: allocating, to each virtual computing environment of only a subset of the first set of multiple virtual computing environments, a first subsequent allocation of compute resources in addition to the first initial allocation of compute resources; wherein an aggregate of the first subsequent allocations of compute resources to the subset of the first set of multiple virtual computing environments is deducted from the portion of the compute resources allocated to the first project sandbox.

A fourth example is the method of the first example, wherein the generating of a virtual computing environment, of the first set of multiple virtual computing environments, is performed when a user who is provided the user access to the virtual computing environment logs into a service hosting the virtual computing environment.

A fifth example is the method of the first example, further comprising: monitoring, for each virtual computing environment, in the first set of multiple virtual computing environments, consumption of the first initial allocation of compute resources; and generating a notification to the first administrator if the monitored consumption of the first initial allocation of compute resources is above a threshold.

A sixth example is the method of the first example, further comprising: preventing a first virtual computing environment, of the first set of multiple virtual computing environments, from performing further emulated computing, if the first virtual computing environment has consumed all compute resources previously allocated to the first virtual computing environment.

A seventh example is the method of the first example, further comprising: preventing a first virtual computing environment, of the first set of multiple virtual computing environments, from performing further emulated computing, if the first virtual computing environment is consuming compute resources previously allocated to the first virtual computing environment faster than a threshold rate, even though the compute resources previously allocated to the first virtual computing environment have not been all consumed.

An eighth example is the method of the first example, further comprising: presenting, to the first administrator, multiple templates; receiving a selection of the first template from the multiple templates; and modifying the first project metadata to comprise the first template based on the selection.

A ninth example is the method of the first example, further comprising: receiving, from the first administrator, a first resource consumption limit; and preventing a first virtual computing environment, of the first set of multiple virtual computing environments, from performing further emulated computing, if the first virtual computing environment's consumption of compute resources previously allocated to the first virtual computing environment exceeds the first resource consumption limit, even though the compute resources previously allocated to the first virtual computing environment have not been all consumed.

A tenth example is a set of computing devices in aggregate comprising: processing units; and one or more computer-readable storage media comprising computer-executable instructions, which, when executed by at least some of the processing units, cause at least some of the set of computing devices to: generate a first set of multiple virtual computing environments, the first set of multiple virtual computing environments comprising a unique virtual computing environment for each member of a team that is enumerated by a team roster, wherein each virtual computing environment comprises emulation of computing hardware specified by a first template; provide, to each member of the team that is enumerated by the team roster, user access to the unique virtual computing environment of the first set of multiple virtual computing environments such that there is a one-to-one correspondence between virtual computing environments of the first set of multiple virtual computing environments and members of the team as enumerated by the team roster; provide administrator access to each virtual computing environment, of the first set of multiple virtual computing environments, to a first administrator; link each virtual computing environment, of the first set of multiple virtual computing environments, to a first project associated with a first project metadata that comprises the first template; link the first project to a team associated with team metadata that comprises the team roster; allocate, to the team sandbox, compute resources available to the first administrator; allocate, to the first project sandbox, a portion of the compute resources available to the first administrator; and allocate, to each virtual computing environment, of the first set of multiple virtual computing environments, a first initial allocation of compute resources, the first initial allocation of compute resources being based on the portion of the compute resources allocated to the first project and on a quantity of virtual computing environments in the first set of virtual computing environments; wherein emulated computing, by a virtual computing environment, consumes compute resources allocated to the virtual computing environment.

An eleventh example is the set of computing devices of the tenth example, wherein the one or more computer-readable storage media comprise further computer-executable instructions, which, when executed by at least some of the processing units, cause at least some of the set of computing devices to further: generate a second set of multiple virtual computing environments, the second set of multiple virtual computing environments also comprising a unique virtual computing environment for each member of the team that is enumerated by the team roster, wherein each virtual computing environment comprises emulation of computing hardware specified by a second template; provide, to each member of the team that is enumerated by the team roster, user access to the unique virtual computing environment of the second set of multiple virtual computing environments such that there is a one-to-one correspondence between virtual computing environments of the second set of multiple virtual computing environments and members of the team as enumerated by the team roster; provide administrator access to each virtual computing environment, of the second set of multiple virtual computing environments, to the first administrator; link each virtual computing environment, of the second set of multiple virtual computing environments, to a second project associated with a second project metadata that comprises the second template; link the second project to the team sandbox; allocate, to the second project sandbox, another portion of the compute resources available to the first administrator; and allocate, to each virtual computing environment, of the second set of multiple virtual computing environments, a second initial allocation of compute resources, the second initial allocation of compute resources being based on the other portion of the compute resources allocated to the second project and on a quantity of virtual computing environments in the second set of virtual computing environments.

A twelfth example is the set of computing devices of the tenth example, wherein the one or more computer-readable storage media comprise further computer-executable instructions, which, when executed by at least some of the processing units, cause at least some of the set of computing devices to further: allocate, to each virtual computing environment of only a subset of the first set of multiple virtual computing environments, a first subsequent allocation of compute resources in addition to the first initial allocation of compute resources; wherein an aggregate of the first subsequent allocations of compute resources to the subset of the first set of multiple virtual computing environments is deducted from the portion of the compute resources allocated to the first project sandbox.

A thirteenth example is the set of computing devices of the tenth example, wherein the generating of a virtual computing environment, of the first set of multiple virtual computing environments, is performed when a user who is provided the user access to the virtual computing environment logs into a service hosting the virtual computing environment.

A fourteenth example is the set of computing devices of the tenth example, wherein the one or more computer-readable storage media comprise further computer-executable instructions, which, when executed by at least some of the processing units, cause at least some of the set of computing devices to further: monitor, for each virtual computing environment, in the first set of multiple virtual computing environments, consumption of the first initial allocation of compute resources; and generate a notification to the first administrator if the monitored consumption of the first initial allocation of compute resources is above a threshold.

A fifteenth example is the set of computing devices of the tenth example, wherein the one or more computer-readable storage media comprise further computer-executable instructions, which, when executed by at least some of the processing units, cause at least some of the set of computing devices to further: prevent a first virtual computing environment, of the first set of multiple virtual computing environments, from performing further emulated computing, if the first virtual computing environment has consumed all compute resources previously allocated to the first virtual computing environment.

A sixteenth example is the set of computing devices of the tenth example, wherein the one or more computer-readable storage media comprise further computer-executable instructions, which, when executed by at least some of the processing units, cause at least some of the set of computing devices to further: prevent a first virtual computing environment, of the first set of multiple virtual computing environments, from performing further emulated computing, if the first virtual computing environment is consuming compute resources previously allocated to the first virtual computing environment faster than a threshold rate, even though the compute resources previously allocated to the first virtual computing environment have not been all consumed.

A seventeenth example is the set of computing devices of the tenth example, wherein the one or more computer-readable storage media comprise further computer-executable instructions, which, when executed by at least some of the processing units, cause at least some of the set of computing devices to further: present, to the first administrator, multiple templates; receive a selection of the first template from the multiple templates; and modify the first project metadata to comprise the first template based on the selection.

An eighteenth example is the set of computing devices of the tenth example, wherein the one or more computer-readable storage media comprise further computer-executable instructions, which, when executed by at least some of the processing units, cause at least some of the set of computing devices to further: receive, from the first administrator, a first resource consumption limit; and prevent a first virtual computing environment, of the first set of multiple virtual computing environments, from performing further emulated computing, if the first virtual computing environment's consumption of compute resources previously allocated to the first virtual computing environment exceeds the first resource consumption limit, even though the compute resources previously allocated to the first virtual computing environment have not been all consumed.

A nineteenth example is one or more computer-readable storage media comprising computer-executable instructions, which, when executed by a computing device, cause the computing device to: generate a first set of multiple virtual computing environments, the first set of multiple virtual computing environments comprising a unique virtual computing environment for each member of a team that is enumerated by a team roster, wherein each virtual computing environment comprises emulation of computing hardware specified by a first template; provide, to each member of the team that is enumerated by the team roster, user access to the unique virtual computing environment of the first set of multiple virtual computing environments such that there is a one-to-one correspondence between virtual computing environments of the first set of multiple virtual computing environments and members of the team as enumerated by the team roster; provide administrator access to each virtual computing environment, of the first set of multiple virtual computing environments, to a first administrator; link each virtual computing environment, of the first set of multiple virtual computing environments, to a first project associated with a first project metadata that comprises the first template; link the first project to a team associated with team metadata that comprises the team roster; allocate, to the team sandbox, compute resources available to the first administrator; allocate, to the first project sandbox, a portion of the compute resources available to the first administrator; and allocate, to each virtual computing environment, of the first set of multiple virtual computing environments, a first initial allocation of compute resources, the first initial allocation of compute resources being based on the portion of the compute resources allocated to the first project and on a quantity of virtual computing environments in the first set of virtual computing environments; wherein emulated computing, by a virtual computing environment, consumes compute resources allocated to the virtual computing environment.

A twentieth example is the computer-readable storage media of the nineteenth example, comprising further computer-executable instructions, which, when executed by the computing device, cause the computing device to further: generate a second set of multiple virtual computing environments, the second set of multiple virtual computing environments also comprising a unique virtual computing environment for each member of the team that is enumerated by the team roster, wherein each virtual computing environment comprises emulation of computing hardware specified by a second template; provide, to each member of the team that is enumerated by the team roster, user access to the unique virtual computing environment of the second set of multiple virtual computing environments such that there is a one-to-one correspondence between virtual computing environments of the second set of multiple virtual computing environments and members of the team as enumerated by the team roster; provide administrator access to each virtual computing environment, of the second set of multiple virtual computing environments, to the first administrator; link each virtual computing environment, of the second set of multiple virtual computing environments, to a second project associated with a second project metadata that comprises the second template; link the second project to the team sandbox; allocate, to the second project sandbox, another portion of the compute resources available to the first administrator; and allocate, to each virtual computing environment, of the second set of multiple virtual computing environments, a second initial allocation of compute resources, the second initial allocation of compute resources being based on the other portion of the compute resources allocated to the second project and on a quantity of virtual computing environments in the second set of virtual computing environments.

As can be seen from the above descriptions, mechanisms for scalably generating and provision computing environments have been presented. In view of the many possible variations of the subject matter described herein, we claim as our invention all such embodiments as may come within the scope of the following claims and equivalents thereto.

We claim:

1. A method for generating a set of multiple virtual computing environments and allocating compute resources among the set of multiple virtual computing environments, the method comprising:
   receiving a first input comprising: a team definition comprising a team roster, and a first project definition comprising a first template;
   automatically generating, based on the first input, a first set of multiple virtual computing environments, the first set of multiple virtual computing environments comprising a unique virtual computing environment for each member enumerated by the team roster, wherein each virtual computing environment comprises emulation of computing hardware specified by the first template;
   automatically providing, to each member enumerated by the team roster, user access to the unique virtual computing environment of the first set of multiple virtual computing environments such that there is a one-to-one correspondence between virtual computing environments of the first set of multiple virtual computing environments and members of the team as enumerated by the team roster;
   automatically creating, based on the first input, administrator access for a first administrator to each virtual computing environment of the first set of multiple virtual computing environments;
   automatically linking each virtual computing environment, of the first set of multiple virtual computing environments, to a first project associated with the first project definition;
   automatically linking the first project to a team defined by the team definition;
   allocating, to the team, a predefined quantity of compute resources;
   automatically allocating, to the first project, a portion of the predefined quantity of compute resources that were allocated to the team; and
   automatically allocating, to each virtual computing environment, of the first set of multiple virtual computing environments, a first initial allocation of compute resources, the first initial allocation of compute resources being based on the portion of the compute resources allocated to the first project and on a quantity of virtual computing environments in the first set of virtual computing environments;
   wherein emulated computing, by a virtual computing environment, consumes compute resources allocated to the virtual computing environment.

2. The method of claim 1, further comprising:
   receiving a second input comprising a second project definition comprising a second template;
   automatically generating, based on the second input, a second set of multiple virtual computing environments, the second set of multiple virtual computing environments also comprising a unique virtual computing environment for each member of the team, wherein each virtual computing environment comprises emulation of computing hardware specified by the second template;
   automatically providing, to each member of the team, user access to the unique virtual computing environment of the second set of multiple virtual computing environments such that there is a one-to-one correspondence between virtual computing environments of the second set of multiple virtual computing environments and members of the team;
   automatically creating, based on the second input, administrator access for the first administrator to each virtual computing environment of the second set of multiple virtual computing environments;
   automatically linking each virtual computing environment, of the second set of multiple virtual computing environments, to a second project associated with the second project definition;
   automatically linking the second project to the team;
   automatically allocating, to the second project, another portion of the predefined quantity of compute resources that were allocated to the team; and
   automatically allocating, to each virtual computing environment, of the second set of multiple virtual computing environments, a second initial allocation of compute resources, the second initial allocation of compute resources being based on the another portion of the compute resources allocated to the second project and on a quantity of virtual computing environments in the second set of virtual computing environments.

3. The method of claim 1, further comprising:
   allocating, to each virtual computing environment of only a subset of the first set of multiple virtual computing environments, a first subsequent allocation of compute resources in addition to the first initial allocation of compute resources;
   wherein an aggregate of the first subsequent allocations of compute resources to the subset of the first set of multiple virtual computing environments is deducted from the portion of the compute resources allocated to the first project.

4. The method of claim 1, wherein the generating of a virtual computing environment, of the first set of multiple virtual computing environments, is delayed until a user who is provided the user access to the virtual computing environment first attempts to access the virtual computing environment.

5. The method of claim 1, further comprising:
   monitoring, for each virtual computing environment, in the first set of multiple virtual computing environments, consumption of the first initial allocation of compute resources; and
   generating a notification to the first administrator if the monitored consumption of the first initial allocation of compute resources is above a threshold.

6. The method of claim 1, further comprising:
   preventing a first virtual computing environment, of the first set of multiple virtual computing environments, from performing further emulated computing, if the first virtual computing environment has consumed all compute resources previously allocated to the first virtual computing environment.

7. The method of claim 1, further comprising:
   preventing a first virtual computing environment, of the first set of multiple virtual computing environments, from performing further emulated computing, if the first virtual computing environment is consuming compute resources previously allocated to the first virtual computing environment faster than a threshold rate, even though the compute resources previously allocated to the first virtual computing environment have not been all consumed.

8. The method of claim 1, further comprising:
presenting, to the first administrator, multiple templates;
receiving a selection of the first template from the multiple templates; and
modifying the first project definition to comprise the first template based on the selection.

9. The method of claim 1, further comprising:
receiving, from the first administrator, a first resource consumption limit; and
preventing a first virtual computing environment, of the first set of multiple virtual computing environments, from performing further emulated computing, if the first virtual computing environment's consumption of compute resources previously allocated to the first virtual computing environment exceeds the first resource consumption limit, even though the compute resources previously allocated to the first virtual computing environment have not been all consumed.

10. A set of computing devices in aggregate comprising:
central processing units (CPUs); and
one or more computer-readable storage media comprising computer-executable instructions, which, when executed by at least some of the processing units, cause at least some of the set of computing devices to:
receive a first input comprising: a team definition comprising a team roster, and a first project definition comprising a first template;
automatically generate, based on the first input, a first set of multiple virtual computing environments, the first set of multiple virtual computing environments comprising a unique virtual computing environment for each member enumerated by the team roster, wherein each virtual computing environment comprises emulation of computing hardware specified by the first template;
automatically provide, to each member enumerated by the team roster, user access to the unique virtual computing environment of the first set of multiple virtual computing environments such that there is a one-to-one correspondence between virtual computing environments of the first set of multiple virtual computing environments and members of the team as enumerated by the team roster;
automatically create, based on the first input, administrator access for a first administrator to each virtual computing environment of the first set of multiple virtual computing environments;
automatically link each virtual computing environment, of the first set of multiple virtual computing environments, to a first project associated with the first project definition;
automatically link the first project to a team defined by the team definition;
allocate, to the team, a predefined quantity of compute resources;
automatically allocate, to the first project, a portion of the predefined quantity of compute resources that were allocated to the team; and
automatically allocate, to each virtual computing environment, of the first set of multiple virtual computing environments, a first initial allocation of compute resources, the first initial allocation of compute resources being based on the portion of the compute resources allocated to the first project and on a quantity of virtual computing environments in the first set of virtual computing environments;
wherein emulated computing, by a virtual computing environment, consumes compute resources allocated to the virtual computing environment.

11. The set of computing devices of claim 10, wherein the one or more computer-readable storage media comprise further computer-executable instructions, which, when executed by at least some of the CPUs, cause at least some of the set of computing devices to further:
receive a second input comprising a second project definition comprising a second template;
automatically generate, based on the second input, a second set of multiple virtual computing environments, the second set of multiple virtual computing environments also comprising a unique virtual computing environment for each member of the team, wherein each virtual computing environment comprises emulation of computing hardware specified by the second template;
automatically provide, to each member of the team, user access to the unique virtual computing environment of the second set of multiple virtual computing environments such that there is a one-to-one correspondence between virtual computing environments of the second set of multiple virtual computing environments and members of the team;
automatically create, based on the second input, administrator access for the first administrator to each virtual computing environment of the second set of multiple virtual computing environments;
automatically link each virtual computing environment, of the second set of multiple virtual computing environments, to a second project associated with the second project definition;
automatically link the second project to the team;
automatically allocate, to the second project, another portion of the predefined quantity of compute resources that were allocated to the team; and
automatically allocate, to each virtual computing environment, of the second set of multiple virtual computing environments, a second initial allocation of compute resources, the second initial allocation of compute resources being based on the another portion of the compute resources allocated to the second project and on a quantity of virtual computing environments in the second set of virtual computing environments.

12. The set of computing devices of claim 10, wherein the one or more computer-readable storage media comprise further computer-executable instructions, which, when executed by at least some of the CPUs, cause at least some of the set of computing devices to further:
allocate, to each virtual computing environment of only a subset of the first set of multiple virtual computing environments, a first subsequent allocation of compute resources in addition to the first initial allocation of compute resources;
wherein an aggregate of the first subsequent allocations of compute resources to the subset of the first set of multiple virtual computing environments is deducted from the portion of the compute resources allocated to the first project sandbox.

13. The set of computing devices of claim 10, wherein the generating of a virtual computing environment, of the first set of multiple virtual computing environments, is delayed until a user who is provided the user access to the virtual computing environment first attempts to access the virtual computing environment.

14. The set of computing devices of claim 10, wherein the one or more computer-readable storage media comprise further computer-executable instructions, which, when executed by at least some of the CPUs, cause at least some of the set of computing devices to further:
    monitor, for each virtual computing environment, in the first set of multiple virtual computing environments, consumption of the first initial allocation of compute resources; and
    generate a notification to the first administrator if the monitored consumption of the first initial allocation of compute resources is above a threshold.

15. The set of computing devices of claim 10, wherein the one or more computer-readable storage media comprise further computer-executable instructions, which, when executed by at least some of the CPUs, cause at least some of the set of computing devices to further:
    prevent a first virtual computing environment, of the first set of multiple virtual computing environments, from performing further emulated computing, if the first virtual computing environment has consumed all compute resources previously allocated to the first virtual computing environment.

16. The set of computing devices of claim 10, wherein the one or more computer-readable storage media comprise further computer-executable instructions, which, when executed by at least some of the CPUs, cause at least some of the set of computing devices to further:
    prevent a first virtual computing environment, of the first set of multiple virtual computing environments, from performing further emulated computing, if the first virtual computing environment is consuming compute resources previously allocated to the first virtual computing environment faster than a threshold rate, even though the compute resources previously allocated to the first virtual computing environment have not been all consumed.

17. The set of computing devices of claim 10, wherein the one or more computer-readable storage media comprise further computer-executable instructions, which, when executed by at least some of the CPUs, cause at least some of the set of computing devices to further:
    present, to the first administrator, multiple templates;
    receive a selection of the first template from the multiple templates; and
    modify the first project definition to comprise the first template based on the selection.

18. The set of computing devices of claim 10, wherein the one or more computer-readable storage media comprise further computer-executable instructions, which, when executed by at least some of the CPUs, cause at least some of the set of computing devices to further:
    receive, from the first administrator, a first resource consumption limit; and
    prevent a first virtual computing environment, of the first set of multiple virtual computing environments, from performing further emulated computing, if the first virtual computing environment's consumption of compute resources previously allocated to the first virtual computing environment exceeds the first resource consumption limit, even though the compute resources previously allocated to the first virtual computing environment have not been all consumed.

19. One or more computer storage media comprising computer-executable instructions, which, when executed by a computing device, cause the computing device to:
    receive a first input comprising: a team definition comprising a team roster, and a first project definition comprising a first template;
    automatically generate, based on the first input, a first set of multiple virtual computing environments, the first set of multiple virtual computing environments comprising a unique virtual computing environment for each member enumerated by the team roster, wherein each virtual computing environment comprises emulation of computing hardware specified by the first template;
    automatically provide, to each member enumerated by the team roster, user access to the unique virtual computing environment of the first set of multiple virtual computing environments such that there is a one-to-one correspondence between virtual computing environments of the first set of multiple virtual computing environments and members of the team as enumerated by the team roster;
    automatically create, based on the first input, administrator access for a first administrator to each virtual computing environment, of the first set of multiple virtual computing environments;
    automatically link each virtual computing environment, of the first set of multiple virtual computing environments, to a first project associated with the first project definition;
    automatically link the first project to a team defined by the team definition;
    allocate, to the team, a predefined quantity of compute resources;
    automatically allocate, to the first project, a portion of the predefined quantity of compute resources that were allocated to the team; and
    automatically allocate, to each virtual computing environment, of the first set of multiple virtual computing environments, a first initial allocation of compute resources, the first initial allocation of compute resources being based on the portion of the compute resources allocated to the first project and on a quantity of virtual computing environments in the first set of virtual computing environments;
    wherein emulated computing, by a virtual computing environment, consumes compute resources allocated to the virtual computing environment.

20. The computer storage media of claim 19, comprising further computer-executable instructions, which, when executed by the computing device, cause the computing device to further:
    receive a second input comprising a second project definition comprising a second template;
    automatically generate, based on the second input, a second set of multiple virtual computing environments, the second set of multiple virtual computing environments also comprising a unique virtual computing environment for each member of the team, wherein each virtual computing environment comprises emulation of computing hardware specified by the second template;
    automatically provide, to each member of the team, user access to the unique virtual computing environment of the second set of multiple virtual computing environments such that there is a one-to-one correspondence between virtual computing environments of the second set of multiple virtual computing environments and members of the team;

automatically create, based on the second input, administrator access for the first administrator to each virtual computing environment of the second set of multiple virtual computing environments;

automatically link each virtual computing environment, of the second set of multiple virtual computing environments, to a second project associated with the second project definition;

automatically link the second project to the team;

automatically allocate, to the second project, another portion of the predefined quantity of compute resources that were allocated to the team; and automatically allocate, to each virtual computing environment, of the second set of multiple virtual computing environments, a second initial allocation of compute resources, the second initial allocation of compute resources being based on the another portion of the compute resources allocated to the second project and on a quantity of virtual computing environments in the second set of virtual computing environments.

* * * * *